(12) United States Patent
Takahashi et al.

(10) Patent No.: US 10,316,934 B2
(45) Date of Patent: Jun. 11, 2019

(54) VEHICLE TRANSMISSION SYSTEM

(71) Applicant: SUZUKI MOTOR CORPORATION, Hamamatsu-Shi, Shizuoka (JP)

(72) Inventors: Hideaki Takahashi, Hamamatsu (JP); Hiromi Deguchi, Hamamatsu (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 307 days.

(21) Appl. No.: 15/234,348

(22) Filed: Aug. 11, 2016

(65) Prior Publication Data

US 2017/0067543 A1 Mar. 9, 2017

(30) Foreign Application Priority Data

Sep. 8, 2015 (JP) ................................ 2015-176935

(51) Int. Cl.
*F16H 3/30* (2006.01)
*F16H 63/18* (2006.01)
*F16H 63/38* (2006.01)

(52) U.S. Cl.
CPC ............... *F16H 3/30* (2013.01); *F16H 63/18* (2013.01); *F16H 63/38* (2013.01)

(58) Field of Classification Search
CPC ............. F16H 3/30; F16H 63/18; F16H 63/38
USPC ................................................ 74/335, 337.5
See application file for complete search history.

(56) References Cited

U.S. PATENT DOCUMENTS

| 8,037,779 | B2* | 10/2011 | Shiozaki | ................. F16H 63/18 74/473.36 |
| 2008/0127766 | A1* | 6/2008 | Ogasawara | ............ B60K 17/08 74/473.16 |
| 2008/0178695 | A1 | 7/2008 | Fujimoto et al. | |
| 2010/0107796 | A1* | 5/2010 | Tomoda | .................. F16H 63/18 74/473.1 |
| 2010/0242655 | A1 | 9/2010 | Ieda et al. | |

(Continued)

FOREIGN PATENT DOCUMENTS

DE 102010013962 A1 11/2010
DE 102010011753 A1 8/2011

(Continued)

OTHER PUBLICATIONS

Office Action dated May 4, 2017 issued by German Patent and Trademark Office during the prosecution of German Patent Application No. 10 2016 116 736.3

*Primary Examiner* — Ha Dinh Ho
(74) *Attorney, Agent, or Firm* — Troutman Sanders LLP

(57) ABSTRACT

A vehicle transmission system includes a shift cam rotated by rotary power from an output torque of a gearshift actuator motor to change a gearshift position and a rotational position holding mechanism configured to hold a rotational position of the shift cam. The rotational position holding mechanism has a rotatable member that is rotated in synchronization with the shift cam and has a plurality of indented portions along a rotational direction and a stopper member inserted into the indented portion of the rotatable member to hold a rotational position of the rotatable member. An unindented portion between the plurality of indented portions on the outer circumferential surface of the rotatable member is formed on a circular arc curved surface concentric on a rotation center line.

4 Claims, 10 Drawing Sheets

(56) References Cited

U.S. PATENT DOCUMENTS

2010/0251846 A1* 10/2010 Pick ................. F16H 61/32
  74/473.12
2011/0226080 A1  9/2011 Ieda et al.

FOREIGN PATENT DOCUMENTS

| | | | |
|---|---|---|---|
| JP | 2005127392 A | 5/2005 |
| JP | 3159206 U | 5/2010 |

\* cited by examiner

VEHICLE TRANSMISSION SYSTEM

CROSS-REFERENCE TO RELATED APPLICATIONS

This application is based upon and claims the benefit of priority of the prior Japanese Patent Application No. 2015-176935, filed on Sep. 8, 2015, the entire contents of which are incorporated herein by reference.

BACKGROUND OF THE INVENTION

[Field of the Invention]
The present invention relates to a vehicle transmission system, and more particularly, to a transmission mechanism that changes (performs a gearshift operation) a gearshift position using a driving force of an actuator and a control unit that controls the actuator.

[Description of the Related Art]
As one of vehicle transmission mechanisms of the prior art, a manual transmission mechanism that changes a gearshift position (performs a gearshift operation) by manually manipulating a selector by a driver is known in the art. For example, the manual transmission mechanism has a driveshaft, a slide gear provided slidably along a driven shaft, a shift fork that makes a sliding operation of the slide gear, and a shift cam rotated to move the shift fork. In addition, as a driver manually manipulates the selector, the shift cam is rotated, and the shift fork is moved in response to the selector manipulation, so that the slide gear slides. As a result, the gearshift position is changed. A gearshift position of the manual transmission mechanism is determined depending on the rotational position (rotation angle) of the shift cam.

The manual transmission mechanism has a feeding mechanism that automatically rotates the shift cam up to a predetermined rotational position. As a result, even when a driver unskillfully manipulates the selector, it is possible to reliably change the gearshift position and hold the changed gearshift position. In Japanese Laid-open Patent Publication No. 2005-127392, a feeding mechanism for the manual transmission mechanism provided with a shift stopper plate and a shift stopper arm is discussed. The shift stopper plate is rotated in synchronization with the shift cam and has a plurality of approximately triangular toothed portions arranged side by side in a circumferential direction (that is, in a rotational direction) on its outer periphery. The shift stopper arm which is swingable or reciprocatable has a roller provided in its tip and biased by a biasing member such that it is inserted into a concave portion between toothed portions of the shift stopper plate. In this configuration, even when a driver stops the shift cam in a position where the roller is not perfectly inserted into the concave portion, the roller of the shift cam is automatically rotated into a position inserted into the concave portion by virtue of the biasing force of the biasing member. For this reason, it is possible to reliably change a gearshift position and hold the changed gearshift position.

On the other hand, an automated manual transmission (AMT) mechanism is known as a mechanism having both excellent power transmitting efficiency of the manual transmission mechanism and convenience of the automatic transmission mechanism. The AMT mechanism has an actuator such as a motor and changes the gearshift position by rotating the shift cam using a driving force of the actuator. The AMT mechanism has a gearshift holding mechanism for holding the gearshift position. The gearshift holding mechanism has a configuration similar to that of the feeding mechanism of the manual transmission mechanism. For example, as discussed in Japanese Utility Model No. 3159206, those having configurations similar to that of the manual transmission mechanism are employed in the shift stopper plate of the AMT mechanism.

Patent Document 1: Japanese Laid-open Patent Publication No. 2005-127392
Patent Document 2: Japanese Utility Model No. 3159206

If the toothed portion of the shift stopper plate has an approximately triangular shape, it is necessary to increase output power of the actuator until the shift stopper arm climbs over the toothed portion of the shift stopper plate. Meanwhile, if the shift stopper arm climbs over the toothed portion of the shift stopper plate, the torque necessary to rotate the shift cam is abruptly reduced. For this reason, it is necessary to abruptly reduce the output power (rotation torque) of the actuator or set it to zero immediately after the shift stopper arm climbs over the Loathed portion of the shift stopper plate. This makes the control difficult. In addition, if the toothed portion of the shift stopper plate has a shape similar to that of Japanese Laid-open Patent Publication No. 2005-127392 or Japanese Utility Model No. 3159206, a significant torque is necessary to allow the shift stopper arm to climb over the toothed portion of the shift stopper plate. This increases a load of the actuator.

SUMMARY OF THE INVENTION

In view of the aforementioned problems, it is therefore an object of the present invention to provide a vehicle transmission system configured to perform a gearshift position change operation using a driving force of an actuator, by which it is possible to easily control the actuator and reduce a load of the actuator.

According to an aspect of the present invention, there is provided a vehicle transmission system including: an input shaft configured to receive transmitted rotary power; an output shaft configured to output the rotary power; a plurality of driving gears that are provided in the input shaft and include a slide gear reciprocatable in an axial line direction of the input shaft; a plurality of driven gears that are provided in the output shaft, include a slide gear reciprocatable in an axial line direction of the output shaft, and mesh with the plurality of driving gears; a plurality of shift forks configured to move each of the slide gear of the plurality of driving gears and the slide gear of the plurality of driven gears; a rotatable shift cam configured to rotate to move the plurality of shift forks; an actuator configured to rotate the shift cam; and a holding mechanism configured to hold a rotational position of the shift cam, wherein the holding mechanism has a rotatable member configured to rotate in synchronization with the shift cam and provided with a plurality of indented portions arranged in a rotational direction and a stopper member insertable to or removable from the indented portion of the rotatable member and biased toward the indented portion so that a rotational position of the rotatable member is held as the stopper member is inserted into the indented portion of the rotatable member, and an unindented portion between the plurality of indented portions on an outer circumferential surface of the rotatable member is a circular-arc curved surface concentric on the rotation center line as seen on a cross section perpendicular to the rotation center line of the shift cam.

The vehicle transmission system may further include a control unit configured to control the actuator. When the shift cam is rotated by driving the actuator, the control unit may perform control such that the actuator generates a torque necessary to allow the stopper member to get out of the indented portion or higher until the stopper member is extruded from the indented portion and comes in contact with the circular arc curved surface. In addition, after the stopper member comes in contact with the circular arc curved surface, the actuator may generate a torque lower than that necessary to allow the stopper member to get out of the indented portion.

DETAILED DESCRIPTION OF THE PREFERRED EMBODIMENTS

Embodiments of the present invention will now be described in detail with reference to the accompanying drawings. In the following description, a saddle type motorcycle will be described by way of example as a vehicle provided with a vehicle transmission system according to an embodiment of the invention. An engine unit of this motorcycle has an integrated assembly structure including an engine (internal combustion engine) as a vehicle driving force source, a gearshift mechanism (transmission mechanism) that perform a gearshift operation for the engine rotary power, and a clutch that connects or disconnects the rotary power between the engine and the gearshift mechanism. The clutch and the gearshift mechanism of the engine unit are formed by employing an automated manual transmission mechanism. This automated manual transmission mechanism and a transmission control unit (TCU) as a control unit for controlling the automated manual transmission mechanism constitute a vehicle transmission system according to an embodiment of the invention.

It is noted that, in the following description, the "automated manual transmission mechanism" may be simply referred to as an "AMT mechanism." In each drawing, the arrow "Fr" denotes a front side of the motorcycle, the arrow "Rr" denotes a rear side, the arrow "R" denotes a right side, and the arrow "L" denotes a left side, the arrow "Up" denotes an upper side, and the arrow "Lw" denotes a lower side as necessary.

<Configuration of Entire Motorcycle>

Figure 1:
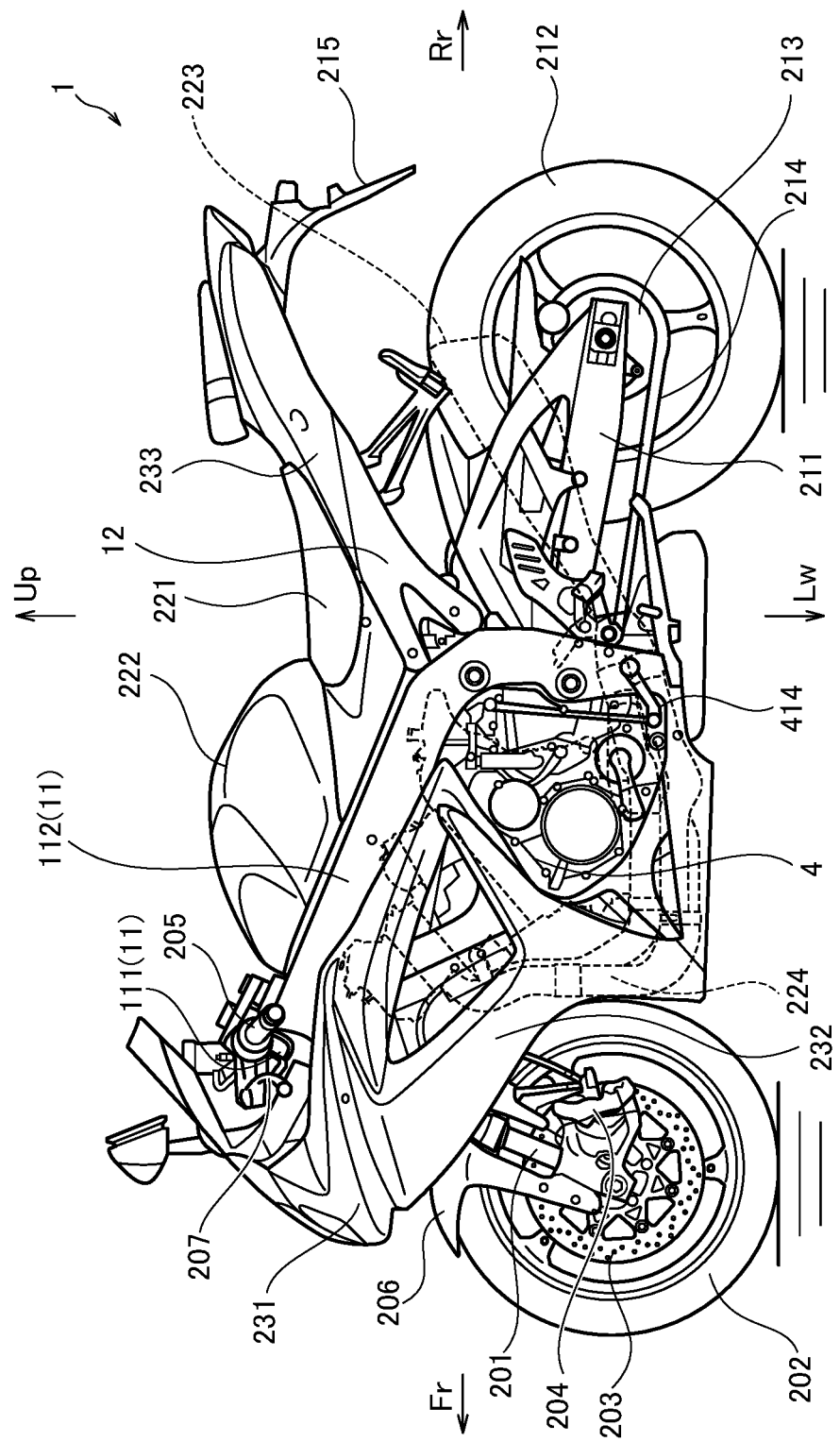
FIG. 1 is a left side view schematically illustrating an exemplary configuration of a motorcycle.

First, a configuration of the entire motor cycle provided with the vehicle transmission system 101 according to this embodiment will be described with reference to FIG. 1. FIG. 1 is a left side view schematically illustrating an exemplary configuration of the motorcycle 1. Although an on-road type motorcycle is described in this embodiment, the invention is not limited to such a type of the motorcycle.

The motorcycle 1 includes a chassis 11 having a steering head pipe 111 and a pair of left and right body frames 112. The steering head pipe 111 has a pipe shape inclined rearward. A pair of left and right body frames 112 has front ends bonded integrally to the steering head pipe 111 and extend rearward and obliquely downward from the steering head pipe 111 with a gap widened in the vehicle width direction. A pair of left and right seat rails 12 is provided in rear parts of the body frames 112. A pair of left and right seat rails 12 supports a seat 221 and extends rearward and obliquely upward from the rear parts of the body frames 112 with a predetermined gap in the vehicle width direction. Each part of the chassis 11 is formed of a steel material or an aluminum alloy material, and they are bonded integrally by welding and the like.

In the front side of the chassis 11, a steering shaft (hidden and not shown in FIG. 1), a pair of left and right front forks 201, and a front wheel 202 are provided. The steering shaft is inserted into a steering head pipe 111 and is rotatably supported by the steering head pipe 111. A pair of left and right front forks 201 is connected to the steering shaft using a bracket or the like and is rotated in synchronization with the steering shaft. The front wheel 202 is rotatably supported by the lower ends of the pair of left and right front forks 201. The front wheel 202 is installed with a brake disk 203 that rotates in synchronization. The pair of left and right front forks 201 is provided with a brake caliper 204 of the front wheel 202 and a front fender 206 that covers an upper side of the front wheel 202. In addition, upper ends of the pair of left and right front forks 201 are installed with left and right handle bars 205 (handle grips), respectively. The left handle bar 205 is provided with a clutch lever 207 for manipulating a clutch 51 described below, and the right handle bar 205 is installed with a brake lever for manipulating a brake of the rear wheel 212. Furthermore, a selector 414 for allowing a rider to manipulate a gearshift mechanism 52 (described below) is provided in the lower part of the chassis 11 on the left side of the vehicle width direction.

A swing arm 211 is vertically swingably (in a pitching direction) connected to the rear part of the chassis 11. A rear wheel 212 as a propulsion wheel is rotatably supported by the rear end of the swing arm 211. A driven sprocket 213 rotating in synchronization with the rear wheel 212 is installed in the left side of the rear wheel 212. A drive chain 214 is looped around the driven sprocket 213 and a driving sprocket 46 (described below) of the engine unit 4. In addition, the rotary power output from the engine unit 4 is transmitted to the rear wheel 212 through the driving sprocket 46 and the drive chain 214. A shock absorber (not shown) is provided between the chassis 11 and the swing arm 211, so that a vibration or shock transmitted from the rear wheel 212 to the chassis 11 is absorbed or alleviated by the shock absorber. In addition, a rear fender 215 is provided above the rear wheel 212.

A seat 221 where a rider (such as a driver or a passenger) is seated is provided on the seat rails 12. A fuel tank 222 is provided on the body frames 112 in front of the seat 221. Furthermore, the motorcycle 1 has exterior members such as a front fairing 231, a side fairing 232, and a seat fairing 233. The front fairing 231 covers the front part of the motorcycle 1, and the side fairing 232 covers the side part of the motorcycle 1. In addition, the seat fairing 233 covers the surrounding of the seat 221. Such exterior members are shell-like members formed of, for example, a synthetic resin material to provide exterior appearance of the motorcycle 1.

<Configuration of Engine Unit>

Figure 2:
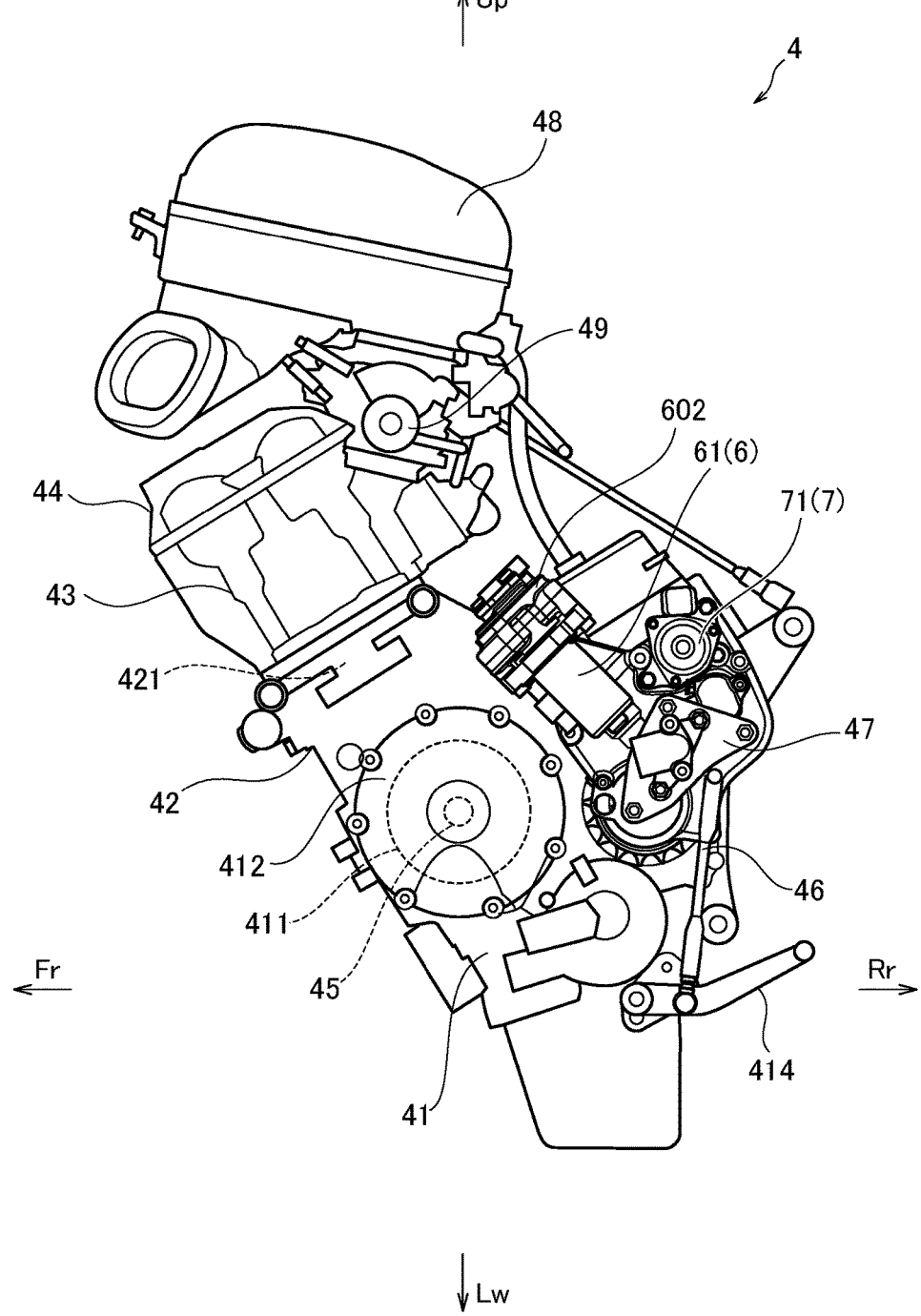
FIG. 2 is a left side view schematically illustrating exemplary configurations of main parts of an engine unit.

Next, an exemplary configuration of the engine unit 4 will be described. FIG. 2 is a left side view schematically illustrating exemplary configurations of main parts of the engine unit 4. The engine unit 4 is suspended to the chassis 11 using a plurality of engine mounts. The engine unit 4 also serves as a strength member of the motorcycle 1. As illustrated in FIG. 2, the engine unit 4 includes a crankcase 41 (also referred to as a "crankcase assembly"), a cylinder block 42, a cylinder head 43, and a cylinder head cover 44. In this embodiment, it is assumed that the engine unit 4 is a front exhaust type four-cylinder parallel engine (internal combustion engine) by way of example.

The crankcase 41 includes a casing body 410, a magnet cover 412 attached to the casing body 410, and a clutch cover. A crank chamber is provided in the vicinity of the front side inside the casing body 410 of the crankcase 41, and a transmission housing is provided in the vicinity of the rear side inside the casing body 410.

A crankshaft 45 is rotatably housed in the crank chamber. Further, the crankshaft 45 is housed such that its axial line (rotation center line) is in parallel with the vehicle width direction (left-right direction). One end of the crankshaft 45 in the axial line direction (right end in the vehicle width direction in this embodiment) is provided with a primary driving gear 451 to rotate in synchronization (refer to FIG. 4), and a magnet 411 is connected to the other end of the crankshaft 45 (left end of the vehicle width direction). The primary driving gear 451 is an exemplary power transmission member for transmitting the rotary power to a gearshift mechanism 52 (transmission mechanism) described below. The magnet 411 is an electric generator that generates electricity using the rotary power of the crankshaft 45. In addition, a magnet cover 412 for covering the magnet 411 is installed in the left side surface of the crankcase 41 in the vehicle width direction.

The clutch 51 and the gearshift mechanism 52 are provided inside the transmission housing. The clutch is configured to switch connection or disconnection between the crankshaft 45 and the gearshift mechanism 52. The clutch 51 is provided in the vicinity of the right side of the crankcase 41 in the vehicle width direction (in the vicinity of a side opposite to that of the crankshaft 45 connected to the magnet 411). In addition, a clutch cover is installed in the right side surface of the casing body 410 of the crankcase 41 in the vehicle width direction to cover the clutch 51.

The gearshift mechanism 52 performs a gearshift operation for the rotary power transmitted from the crankshaft 45 through the clutch 51 to transmit the rotary power to the rear wheel 212 as a propulsion wheel. According to this embodiment, as the gearshift mechanism 52, a constant mesh type gearshift mechanism is employed by way of example. The gearshift mechanism 52 includes a countershaft 521, a driveshaft 522, a driving gear 523, and a driven gear 524. The countershaft 521 and the driveshaft 522 are rotatably housed in the transmission housing. The countershaft 521 is an example of the input shaft for receiving rotary power transmitted from the outside (in this embodiment, the crankshaft 45). The driveshaft 522 is an example of the output shaft for outputting the rotary power to the outside of the driveshaft 522 (in this embodiment, the rear wheel 212 as an example of the propulsion wheel). The countershaft 521 and the driveshaft 522 are in parallel with each other so that their axial lines (rotation center lines) are in parallel with each other in the vehicle width direction. A predetermined number of driving gears 523 are provided in the countershaft 521. A predetermined number of driven gears 524 are provided in the driveshaft 522. In addition, a predetermined number of driving gears 523 and a predetermined number of driven gears 524 mesh with each other respectively and constantly. Note that the configuration of the gearshift mechanism 52 will be described below in more detail.

One end of the driveshaft 522 in the vehicle width direction (in this embodiment, the left end of the vehicle width direction) protrudes to the outside of the casing body 410 of the crankcase 41 behind the magnet cover 412. A driving sprocket 46 is installed in this protruding portion to rotate in synchronization with the driveshaft 522. In addition, a drive chain 214 is looped around the driving sprocket 46 and the driven sprocket 213 of the rear wheel 212. Further, a sprocket cover 47 for covering the driving sprocket 46 is installed on the left side surface of the casing body 410 of the crankcase 41 in the vehicle width direction. The sprocket cover 47 has, for example, an approximately plate shape or a one-side-opened shallow-bottom box shape. In addition, the sprocket cover 47 is disposed outside from the driving sprocket 46 in the vehicle width direction and far from the side surface of the casing body 410 of the crankcase 41 toward the outside of the vehicle width direction. For example, the sprocket cover 47 is detachably installed in the casing body 410 of the crankcase 41 using a screw or the like by interposing a spacer having a tubular shape or a columnar shape. Note that any configuration of the sprocket cover 47 may be employed as long as it covers the outside of the driving sprocket 46 in the vehicle width direction without a particular limitation.

A cylinder block 42 is provided in the upper side in the vicinity of the front side of the casing body 410 of the crankcase 41 (that is, where the crank chamber is provided). Inside the cylinder block 42, a plurality of cylinders 421 (in this embodiment, four cylinders) are arranged side by side in a line along the vehicle width direction. Axial lines of the plurality of cylinders 471 are in parallel with each other and are inclined forward as seen from the vehicle width direction as illustrated in FIG. 2. Pistons (not shown) are housed inside each cylinder 421 in a reciprocatable manner, and each piston is connected to the crankshaft 45 through a connecting rod. A cylinder head 43 is provided on the cylinder block 42. In the cylinder head 43, an intake port, an exhaust port, an intake valve, an exhaust valve, and a valve driving mechanism are provided for each of the cylinders 421. The intake port is a passage of a gas mixture of the fuel and the air in each of the cylinders 421. The exhaust port is an exhaust passage. The intake and exhaust valves are configured to open or close the intake and exhaust ports, respectively. The valve driving mechanism drives the intake and exhaust valves to be opened or closed. According to this embodiment, the intake ports are provided in the rear side of the cylinder head 43, and the exhaust ports are provided in the front side by way of example. A cylinder head cover 44 is provided on the cylinder head 43. The cylinder head cover 44 covers the valve driving mechanism provided in the cylinder head 43.

An air cleaner 48 is provided over the cylinder head 43 and the cylinder head cover 44. The air cleaner 48 receives and purifies the combustion air used in the engine unit 4. The air cleaner 48 and each intake port are connected to each other through an intake passage such that air can pass therebetween. In addition, each intake passage is provided with a throttle body 49 for controlling a flow rate of the combustion air. In this configuration, the air flowing to the air cleaner 48 flows to each cylinder 421 from each intake port while a flow rate of the air is controlled by the throttle body 49.

The exhaust pipe 224 as an exhaust gas passage is connected to the exhaust ports provided in the front surface side of the cylinder head 43. A sound muffler 223 is connected to the rear end of the exhaust pipe 224. The exhaust gases generated in each cylinder 421 are discharged to the outside through the exhaust ports of each cylinder 421, the exhaust pipe 224, and the sound muffler 223.

<Configuration of AMT Mechanism>

Figure 3:
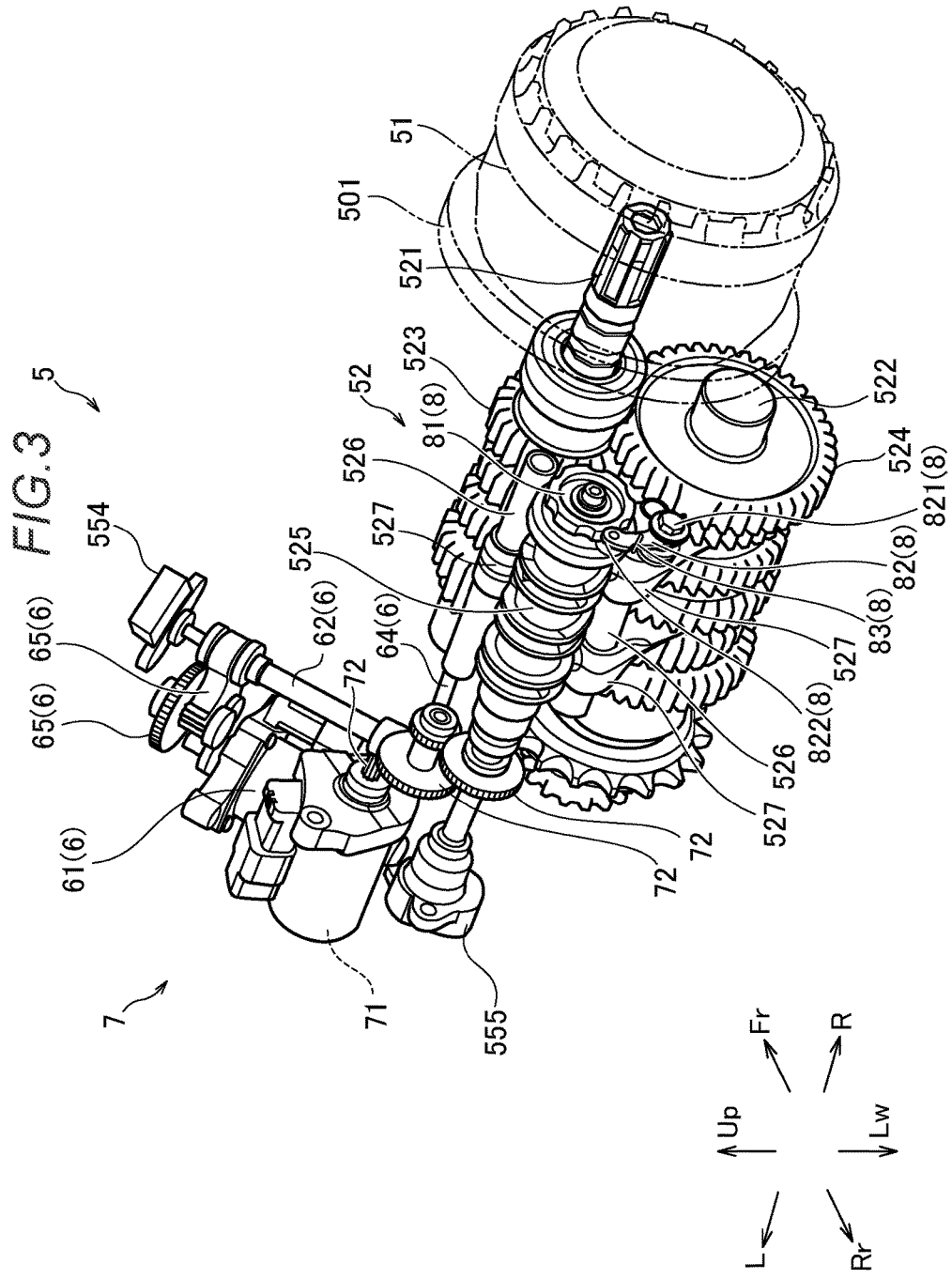
FIG. 3 is a perspective view schematically illustrating exemplary configurations of main parts of an automated manual transmission (AMT) mechanism.
Figure 4:
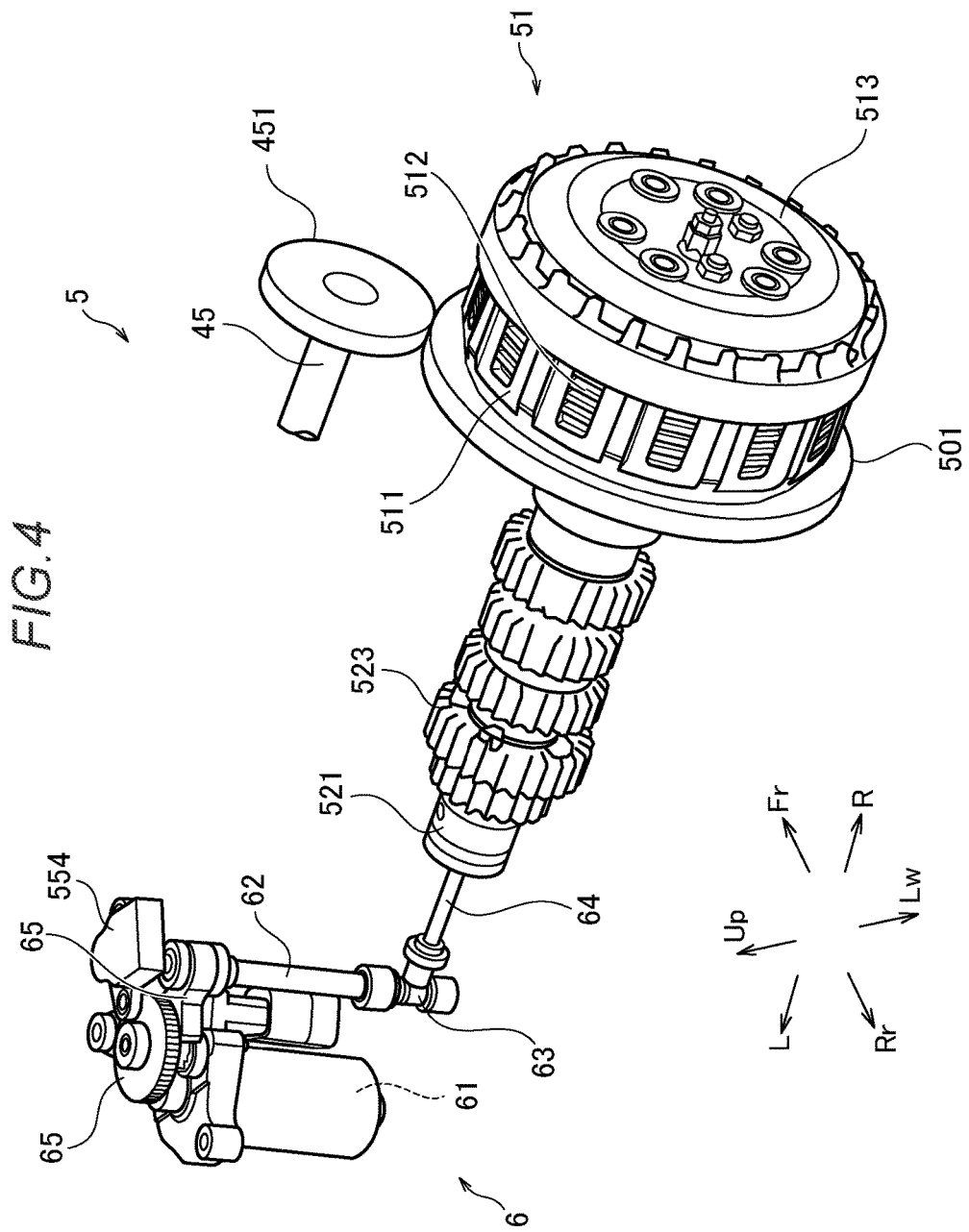
FIG. 4 is a perspective view schematically illustrating exemplary configurations of a clutch and a clutch driving mechanism of the AMT mechanism.

Next, a configuration of the AMT mechanism 5 will be described with reference to FIGS. 3 and 4. FIG. 3 is a perspective view schematically illustrating exemplary configurations of main parts of the AMT mechanism 5. FIG. 4 is a perspective view schematically illustrating an exemplary configuration of the clutch 51 and the clutch driving mechanism 6 of the AMT mechanism 5. As illustrated in FIGS. 3 and 4, the AMT mechanism 5 includes a clutch 51, a clutch driving mechanism 6 that switches connection or disconnection of the clutch 51, a gearshift mechanism 52, and a gearshift driving mechanism 7 that changes a gearshift position of the gearshift mechanism 52.

<Clutch>

As illustrated in FIG. 4, the clutch 51 is provided in the right end of the countershaft 521 in the vehicle width direction and coaxially with the countershaft 521. According to this embodiment, a wet multi-plate clutch is employed as the clutch 51 by way of example. In addition, the clutch 51 is configured to switch connection or disconnection of the rotary power between the crankshaft 45 and the countershaft 521 by axially moving a push rod 64 (also referred to as a "clutch rod") housed in the countershaft 521 which is a hollow shaft.

The clutch 51 has a clutch housing 511, a clutch sleeve hub (hidden and not shown in FIG. 4), and a pressure disk 513. The clutch housing 511 is provided in the right end of the countershaft 521 in the vehicle width direction. In addition, the clutch housing 511 is coaxial with the countershaft 521 so that it can rotate relative to the countershaft 521. In the inner circumferential side of the clutch housing 511, a plurality of driving plates 512 are arranged side by side in the axial line direction of the countershaft 521. In addition, the clutch housing 511 is combined with a primary driven gear 501 by interposing a shock absorbing mechanism such as a spring so that it rotates in synchronization with the primary driven gear 501. The primary driven gear 501 meshes with the primary driving gear 451 provided in the crankshaft 45 so that the rotary power of the crankshaft 45 is transmitted to the clutch 51. The clutch sleeve hub is provided in the inner circumferential side of the clutch housing 511 to rotate in synchronization with the countershaft 521. In the clutch sleeve hub, a plurality of driven plates (hidden and not shown in FIG. 4) is arranged side by side along the axial line direction.

A plurality of driving plates 512 provided in the clutch housing 511 and a plurality of driven plates provided in the clutch sleeve hub are arranged alternatingly along the axial line direction of the countershaft 521. The pressure disk 513 is provided in the outer side of the clutch housing 511 and the clutch sleeve hub in the vehicle width direction (in this embodiment, the right side of the vehicle width direction) to be displaceable relative to the countershaft 521 in the axial line direction. Between the pressure disk 513 and the clutch sleeve hub, a biasing member such as a coil spring is provided. In addition, the pressure disk 513 is biased to the center of the vehicle width direction (the left side of the vehicle width direction) by virtue of the biasing force of the biasing member. The driving plate 512 and the driven plate are maintained in a contact state with a predetermined pressure in the axial line direction by virtue of the biasing force of the biasing member.

The push rod 64 is housed in the countershaft 521, which is a hollow shaft, reciprocatably along its axial line direction. The push rod 64 is shifted to the right in the vehicle width direction as a release cam 62 described below is rotated, so as to push and move the pressure disk 513 to the outer side of the vehicle width direction (the right side of the vehicle width direction).

While the push rod 64 does not push the pressure disk 513, the driving plate 512 and the driven plate are maintained in a contact state with a predetermined pressure in the axial line direction by virtue of the biasing force of the biasing member as described above. In this state, the rotary power of the crankshaft 45 is transmitted to the countershaft 521 through the primary driving gear 451, the primary driven gear 501, the clutch housing 511, the driving plate 512, the driven plate, and the clutch sleeve hub. This state is a so-called "clutch-connected" state.

As the pressure disk 513 is pushed by the push rod 64 and moves to the right side of the vehicle width direction, a contact pressure between the driving plate 512 and the driven plate is reduced. For this reason, the clutch 51 is switched from a state in which the rotary power of the crankshaft 45 is transmitted to the countershaft 521 to a state in which the rotary power is transmitted, but is not perfectly transmitted. This state is a so-called "half-clutch" state. As the pressure disk 513 is pushed by the push rod 64 and further moves to the right side of the vehicle width direction, the contact pressure between the driving plate 512 and the driven plate is eliminated. In addition, the clutch 51 is switched to a state in which the rotary power of the crankshaft 45 is not transmitted to the countershaft 521. This state is a so-called "clutch-disconnected" state. According to this embodiment, a clutch driving mechanism 6 described below moves the push rod 64 to the right side of the vehicle width direction, so that connection/disconnection of the clutch 51 is switched.

<Clutch Driving Mechanism>

The clutch driving mechanism 6 has a clutch actuator motor 61, a release cam 62, and a gear train 65. The clutch actuator motor 61 is a driving force source for the connection/disconnection switching operation of the clutch 51 in the clutch driving mechanism 6. The clutch actuator motor 61 is installed in the sprocket cover 47 while it is housed in a motor casing. Note that any one of various motors known in the art such as a servo motor may be employed as the clutch actuator motor 61. The release cam 62 is rotatably provided to rotate by virtue of the driving force (rotary power) of the clutch actuator motor 61. The gear train 65 decelerates and transmits the driving force (rotary power) of the clutch actuator motor 61 to the release cam 62.

The release cam 62 is provided with a cam body 63 that rotates in synchronization. The cam body 63 abuts on the left end surface of the push rod 64 in the vehicle width direction so that, as it rotates, the push rod 64 is forced to move toward the right side of the vehicle width direction resisting to the biasing force of the biasing member. Note that the cam body 63 is shaped such that the displacement of the push rod 64 changes depending on a rotation angle of the release cam 62. In particular, the cam body 63 is shaped such that, as the rotation angle of the release cam 62 increases, the displacement of the push rod 64 increases. In addition, the release cam 62 is provided with a clutch position sensor 554 for detecting a rotation angle of the release cam 62. Any one of various angle sensors known in the art may be employed as the clutch position sensor 554.

In this configuration, the driving force (rotary power) of the clutch actuator motor 61 is decelerated by the gear train 65 and is transmitted to the release cam 62. As the release cam 62 is rotated, the cam body 63 pushes the push rod 64 to move to the right side of the vehicle width direction. As described above, the cam body 63 is shaped such that the displacement of the push rod 64 increases as the rotation angle of the release cam 62 increases. For this reason, as the release cam 62 is rotated in a predetermined direction, the clutch 51 is switched sequentially from a state in which the rotary power is transmitted (clutch-connected state) to a state in which the rotary power is transmitted, but is not perfectly transmitted (half-clutch state) and a state in which the rotary power is not transmitted (clutch-disconnected state). Meanwhile, if the clutch actuator motor 61 rotates the release cam 62 oppositely to the predetermined direction in the clutch-disconnected state, the push rod 64 moves to the left side of the vehicle width direction by virtue of the biasing force of the biasing member. For this reason, the clutch 51 is sequentially switched from the clutch-disconnected state to the half-clutch state and the clutch-connected state. In this manner, the clutch driving mechanism 6 of the AMT mechanism 5 changes connection/disconnection of the clutch 51 depending on the driving force (rotary power) of the clutch actuator motor 61.

Note that the configurations of the clutch 51 and the clutch driving mechanism 6 described above are just for illustrative purposes, and the invention is not limited thereby. Any one of various configurations known in the art may be employed as the clutch 51 as long as the connection/disconnection of the rotary power can be switched using the driving force of the clutch actuator motor 61. In addition, any configuration may be employed as the clutch driving mechanism 6 as long as the connection/disconnection of the clutch 51 can be switched using the driving force of the actuator.

<Gearshift Mechanism and Gearshift Driving Mechanism>

The gearshift mechanism 52 has a countershaft 521, a driveshaft 522, a predetermined number of (a plurality of) driving gears 523, a predetermined number of (a plurality of) driven gears 524, a shift cam 525, a shift fork 527, and a shift fork guide 526. In addition, the gearshift mechanism 52 is built inside the transmission housing. The axial lines (rotation center lines) of the countershaft 521 and the driveshaft 522 are in parallel with each other, and both of them are in parallel with the vehicle width direction. Furthermore, the countershaft 521 is provided with a predetermined number of driving gears 523, and the driveshaft 522 is provided with a predetermined number of driven gears 524.

A predetermined number of driving gears 523 include a fixed gear, a slide gear, and a freewheel gear. A predetermined number of driven gears 524 include a slide gear and a freewheel gear. The fixed gear included in the driving gears 523 is fixed to the countershaft 521 immovably in the axial line direction so that it is rotated in synchronization with the countershaft 521. The slide gear included in the driving gears 523 can rotate in synchronization with the countershaft 521 and move along the axial line direction with respect to the countershaft 521 in a slidable manner. The freewheel gear included in the driving gears 523 is prohibited to move in the axial line direction with respect to the countershaft 521, but can rotate relative to the countershaft 521.

The fixed gear included in the driven gears 524 is fixed immovably in the axial line direction to the driveshaft 522 and rotate in synchronization with the driveshaft 522. The slide gear included in the driven gears 524 is rotated in synchronization with the driveshaft 522 and can move along the axial line direction with respect to the driveshaft 522 in a slidable manner. The freewheel gear included in the driven gears 524 is prohibited to move in the axial line direction with respect to the driveshaft 522, but can rotate relative to the driveshaft 522.

A predetermined fixed gear and a predetermined slide gear of the driving gears 523 mesh with a predetermined freewheel gear of the driven gears 524 at all times. In addition, a predetermined freewheel gear of the driving gears 523 meshes with a predetermined slide gear of the driven gears 524 at all times. The freewheel gears and the slide gears of the driving and driven gears 523 and 524 are provided with dogs. As the slide gear moves in the axial line direction and is engaged with the dog of the freewheel gear neighboring to the dog of the slide gear, the slide gear and the freewheel gear rotate in synchronization with each other.

The shift cam 525 is a circular columnar or cylindrical member rotatably housed in the transmission housing. Note that the axial line (rotation center line C) of the shift cam 525 is in parallel with the axial lines of the countershaft 521 and the driveshaft 522 and also in parallel with the vehicle width direction. The outer circumferential surface of the shift cam 525 is provided with a cam groove engaged with the shift fork 527. In addition, a gearshift position sensor 555 for detecting a rotation angle of the shift cam 525 is provided in the left end of the shift cam 525 in the vehicle width direction. Any one of various angle sensors known in the art may be employed as the gearshift position sensor 555.

The shift fork guide 526 is a bar-shaped member, and its axial line direction (longitudinal direction) is aligned in parallel with those of the crankshaft and the driveshaft 522 and also in parallel with the vehicle width direction. The shift fork guide 526 is provided with a predetermined number of (a plurality of) shift forks 527 reciprocatable in a sliding manner along the axial line direction. Each shift fork 527 is engaged with a predetermined slide gear, and a cam pin provided in the shift fork 527 is engaged with the cam groove of the shift cam 525. As the shift cam 525 is rotated, the shift fork 527 is moved along the axial line direction of the shift fork guide 526 to move the engaged slide gear. As a result, a power transmission path from the countershaft 521 to the driveshaft 522, that is, the gearshift position of the gearshift mechanism 52 is changed.

The gearshift driving mechanism 7 has a gearshift actuator motor 71 and a gear train 72. The gearshift actuator motor 71 is a driving force source of the gearshift position change operation (gearshift operation) of the gearshift mechanism 52 in the gearshift driving mechanism 7. The gear train 72 decelerates the driving force (rotary power) of the gearshift actuator motor 71 and transmits it to the shift cam 525. The shift cam 525 shifts the shift fork 527 in the axial line direction of the shift fork guide 526 as it is rotated by receiving the driving force (rotary power) of the gearshift actuator motor 71. In addition, by virtue of the movement of the shift fork 527, the slide gear is moved in the axial line direction, so that the engagement state between the slide gear and the freewheel gear is switched. In this manner, the gearshift driving mechanism 7 changes the gearshift position of the gearshift mechanism 52 using the driving force (rotary power) of the gearshift actuator motor 71. Further, the gearshift actuator motor 71 is installed in the sprocket cover 47 while it is housed in the motor casing. Any one of various motors known in the art such as a servo motor may be employed as the gearshift actuator motor 71.

It would be appreciated that, while the aforementioned configurations of the gearshift mechanism 52 and the gearshift driving mechanism 7 have been described just for illustrative purposes, the present invention is not limited thereby. The gearshift mechanism 52 may change the gearshift position using the rotation of the shift cam 525, and any one of various configurations known in the art may also be employed. Furthermore, any configuration may be employed as the gearshift driving mechanism 7 as long as it can rotate the shift cam 525.

<Transmission System>

Figure 5:
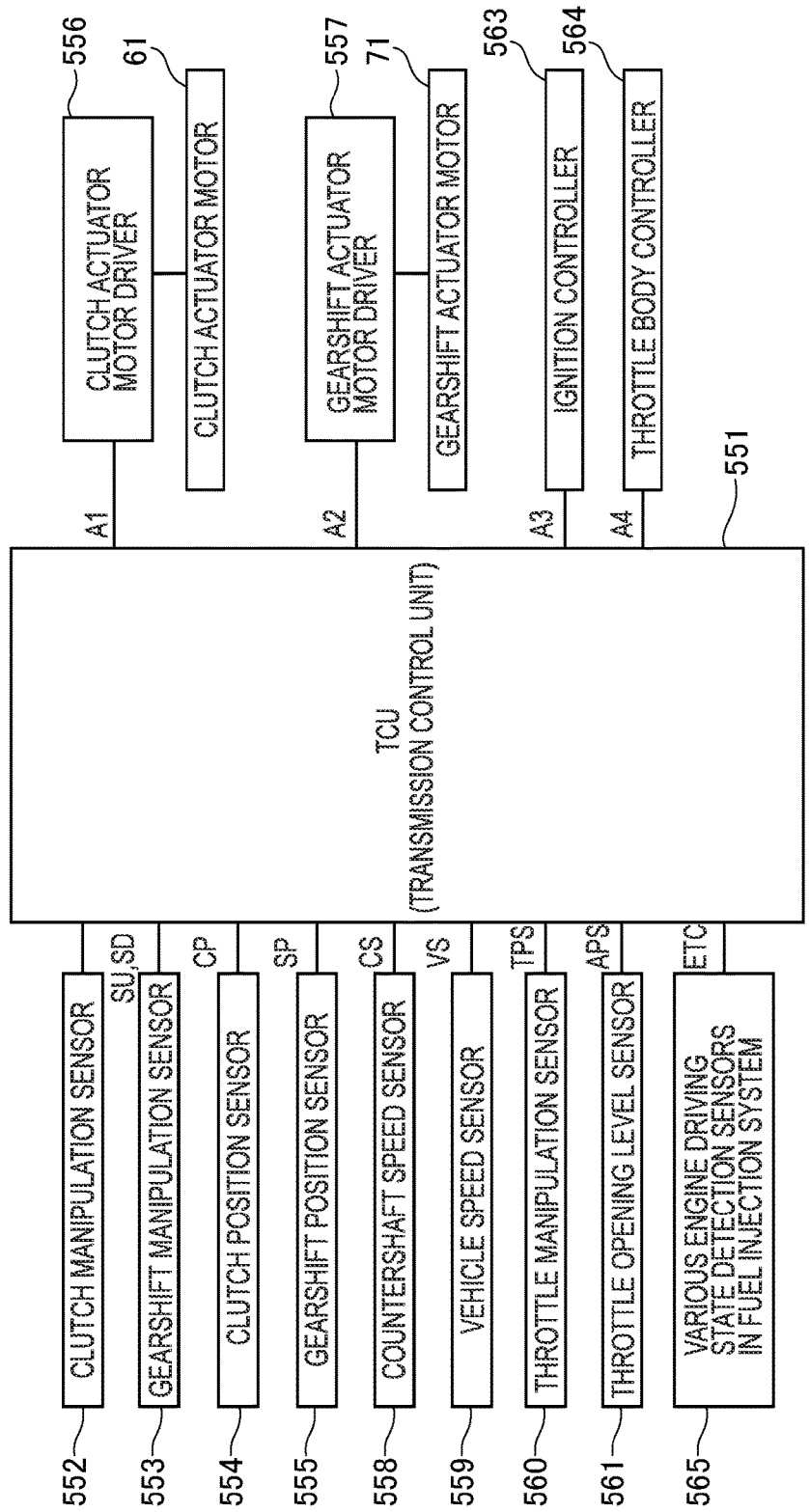
FIG. 5 is a block diagram illustrating exemplary configurations of main parts of a transmission system.

Next, a vehicle transmission system 101 according to this embodiment will be described. The vehicle transmission system 101 according to this embodiment includes the AMT mechanism 5 described above and a transmission control unit (TCU) 551 as an example of the control unit for controlling the AMT mechanism 5. Here, the transmission system 101 will be described with reference to FIG. 5. FIG. 5 is a block diagram illustrating exemplary configurations of main parts of the transmission system 101.

The TCU 551 as an example of the control unit is, for example, a computer having a central processing unit (CPU), a read-only memory (ROM), and a random access memory (RAM). A computer program or various setting information for controlling the AMT mechanism 5 are stored in the ROM in advance. The CPU reads the computer program stored in the ROM and executes it by using the RAM as a work area. In this case, various setting information stored in the ROM is appropriately read and referenced. As a result, control operations of the AMT mechanism 5 such as a change of the gearshift position of the gearshift mechanism 52 (gearshift operation) or switching between connection and disconnection of the clutch 51 are implemented.

As illustrated in FIG. 5, a clutch actuator motor driver 556, a gearshift actuator motor driver 557, an ignition controller 563, and a throttle body controller 564 are connected to the TCU 551. These are operated in response to operation signals A1 to A4 transmitted from the TCU 551. The clutch actuator motor driver 556 is a driving circuit for driving the clutch actuator motor 61 under the control of the TCU 551. The gearshift actuator motor driver 557 is a driving circuit for driving the gearshift actuator motor 71 under the control of the TCU 551.

A clutch manipulation sensor 552, a gearshift manipulation sensor 553, a clutch position sensor 554, and a gearshift position sensor 555 are connected to the TCU 551. The clutch manipulation sensor 552 detects manipulation of the clutch lever 207 and outputs a detection signal representing a manipulation amount of the clutch lever 207. The gearshift manipulation sensor 553 detects whether an upshift or downshift manipulation is performed in the selector 414. In addition, when the upshift manipulation is detected, a gearshift detection signal SU is output to the TCU 551. When the downshift manipulation is detected, a gearshift detection signal SD is output to the TCU 551. The clutch position sensor 554 detects a rotation angle (that is, a clutch position) of the release cam 62 and outputs a clutch position signal CP representing the detection result to the TCU 551. The gearshift position sensor 555 detects a rotation angle of the shift cam 525 and outputs a shift position signal SP representing the rotation angle to the TCU 551.

Furthermore, a countershaft speed sensor 558, a vehicle speed sensor 559, a throttle manipulation sensor 560, and a throttle opening level sensor 561 are connected to the TOO 551. The countershaft speed sensor 558 detects a rotation speed of the countershaft 521 and outputs a rotation speed signal CS representing the rotation speed to the TCU 551. The vehicle speed sensor 559 detects a vehicle speed (travel speed) of the motorcycle 1 and outputs a vehicle speed signal VS representing the vehicle speed to the TCU 551. The throttle manipulation sensor 560 detects a manipulation amount of a throttle grip from a driver of the motorcycle 1 and outputs a throttle position signal TPS representing the manipulation amount to the TCU 551. The throttle opening level sensor 561 detects an opening level of the throttle valve of the throttle body 49 and outputs the throttle valve position signal APS representing its opening level to the TCU 551.

Moreover, various engine driving state detection sensors 565 necessary in a fuel injection system are connected to the TCU 551. Such sensors 565 include, for example, a coolant temperature sensor, an intake temperature sensor, an oil temperature sensor, an oxygen sensor, and the like. Such sensors 565 output signals ETC representing corresponding detection values to the TCU 551.

If a driver manipulates the selector 414, the gearshift manipulation sensor 553 outputs any one of the gearshift detection signal SU or SD to the TCU 551 depending on the upshift manipulation or the downshift manipulation. If the TCU 551 receives the gearshift detection signal SU or SD, the output power of the engine unit 4 is controlled on the basis of various signals CP, SP, CS, VS, TPS, APS, and ETC output from the sensors. In addition, the gearshift position of the AMT mechanism 5 is changed by controlling the clutch actuator motor driver 556 and the gearshift actuator motor driver 557.

Specifically, first, the TCU 551 receives the gearshift detection signal SU or SD and drives the clutch actuator motor 61 using the clutch actuator motor driver 556 to switch the clutch 51 to the clutch-disconnected state. Then, the TCU 551 drives the gearshift actuator motor 71 using the gearshift actuator motor driver 557 to change the gearshift position of the AMT mechanism 5. Then, the TCU 551 drives the clutch actuator motor 61 using the clutch actuator motor driver 556 to switch the clutch 51 to the clutch-connected state.

The ICU 551 determines a driving status of the engine unit 4 on the basis of the input signals from various sensors when the gearshift position is changed by driving the gearshift actuator motor 71. For example, the TCU 551 controls an ignition controller 563 in an upshift operation to perform ignition cutting (ignition thinning) or retard ignition timings. In addition, in a downshift operation, the TCU 551 controls a throttle body controller 564 to perform blipping (idling). Through such process, the loads of dogs provided in the driving gears 523 and the driven gears 524 of the AMT mechanism 5 are reduced (or become zero). In addition, it is possible to smoothly change the gearshift position and reduce the time necessary to change the gearshift position.

The TCU 551 determines whether or not a shock (gearshift shock) generated in switching to the clutch-connected state is serious on the basis of the input signals from various sensors when the change of the gearshift position is completed, and the clutch is switched to the clutch-connected state. If it is determined that the gearshift shock is serious, the TCU 551 controls the clutch actuator motor driver 556 such that the clutch 51 makes slow switching to the clutch-connected state, and the half-clutch state is retarded. As a result, it is possible to alleviate the gearshift shock.

<Control of AMT Mechanism>

Figure 6:
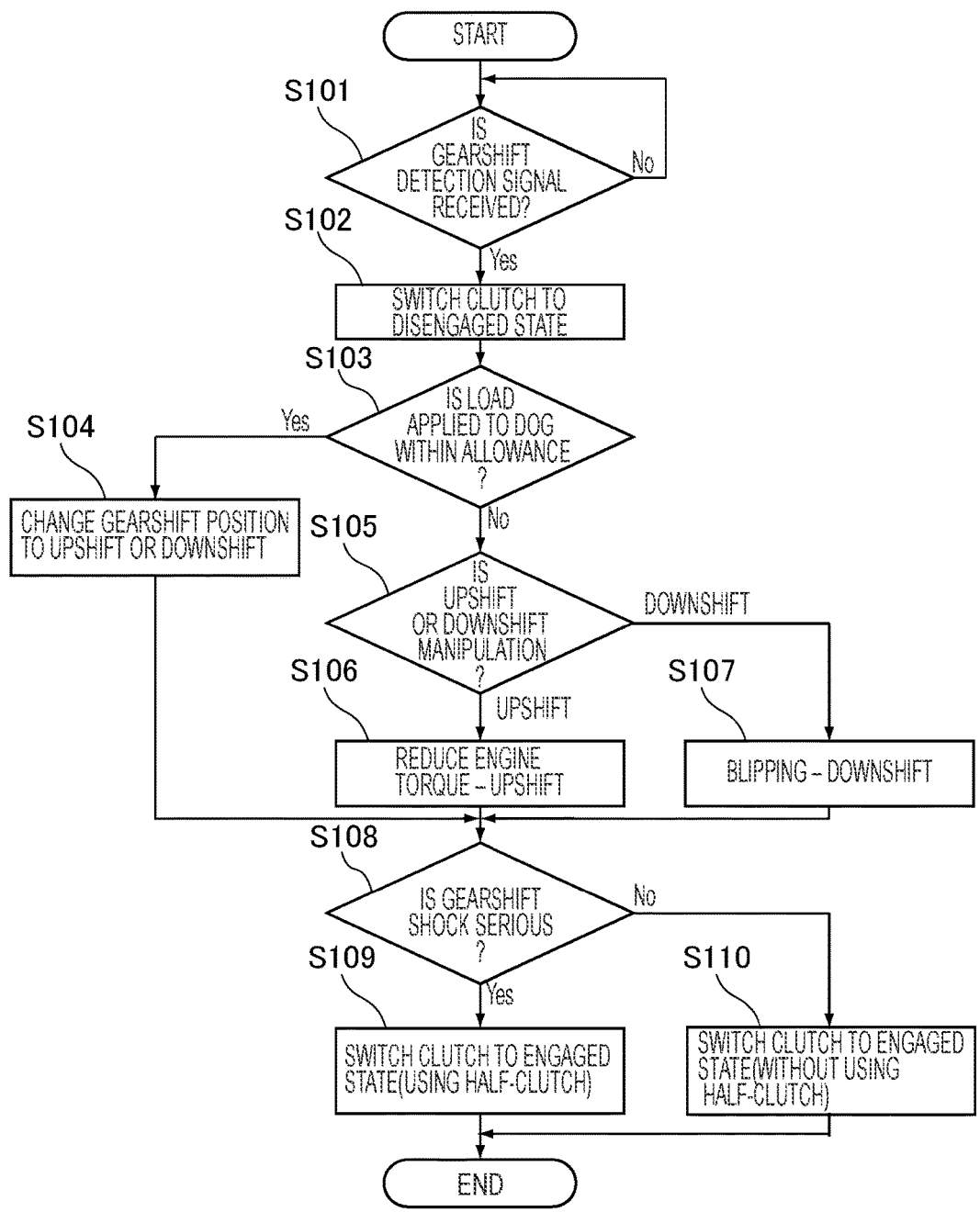
FIG. 6 is a flowchart illustrating a control operation of the AMT mechanism to change a gearshift position.

Next, the control of the AMT mechanism 5 performed when the gearshift position is changed will be described with reference to FIG. 6. FIG. 6 is a flowchart illustrating the control of the AMT mechanism 5 when the gearshift position is changed.

In step S101, the TCU 551 determines whether or not the gearshift detection signal SU or SD has been received from the gearshift manipulation sensor 553. If it is detected that the selector 414 makes an upshift manipulation, the gearshift manipulation sensor 553 outputs the gearshift detection signal SU to the TCU 551. If it is detected that the selector 414 makes a downshift manipulation, the gearshift detection signal SD is output to the ICU 551. If the TCU 551 does not receive any one of the gearshift detection signal SU or SD, the process waits in step S101. If the gearshift detection signal SU or SD is received, the process advances to step S102.

In step S102, the TCU 551 controls the clutch actuator motor driver 556 such that the clutch actuator motor 61 is driven to switch the clutch 51 to the clutch-disconnected state. Then, the process advances to step S103.

In step S103, the TCU 551 determines whether the load of the dog provided in the driving gears 523 and the driven gears 524 of the AMT mechanism 5 is equal to or lower than an allowance. The TCU 551 performs this determination by referencing data from the countershaft speed sensor 558, the vehicle speed sensor 559, an oil temperature sensor (not shown), or a gearshift dog load map. If the load is equal to or lower than the allowance, the process advances to step S104. Otherwise, the process advances to step S105.

In step S104, the TCU 551 controls the gearshift actuator motor driver 557 such that the gearshift actuator motor 71 is driven to change the gearshift position (gearshift operation). Then, the process advances to step S108. Note that the control of the gearshift actuator motor 71 in the change of the gearshift position will be described below in more detail.

In step S105, the TCU 551 determines whether the upshift or downshift manipulation has been performed. If the gearshift detection signal SU is received in step S101, the TCU 551 determines that the upshift manipulation has been performed. In this case, the process advances to step S106. Meanwhile, if the gearshift detection signal SD is received, the TCU 551 determines that the downshift manipulation has been performed. In this case, the process advances to step S107.

In step S106, the TCU 551 performs the upshift operation while reducing the engine torque. Note that the process advances to step S106 when the load of the dog is higher than the allowance, and the upshift manipulation is performed. In this case, the TCU 551 alleviates the load of the dog by reducing the engine torque in the upshift operation. As a method of reducing the engine torque, for example, an ignition cutting technique (ignition thinning) or an ignition timing retardation technique is employed. Through this process, it is possible to expedite the upshift operation by reducing the dog meshing time. Then, the process advances to step S108.

In step S107, the TCU 551 blips the engine unit 4 and then performs a downshift operation. Note that the process advances to step S107 when the load of the dog is higher than the allowance, and the downshift operation is performed. In this case, the TCU 551 blips the engine unit 4 in the downshift operation so that the load of the dog is reduced by matching the rotation speed between the driving gears 523 and the driven gears 524 of the AMT mechanism 5. For example, the TCU 551 performs the blipping by controlling the throttle body controller 564. Through this process, it is possible to reduce the dog meshing time and expedite the downshift operation. Then, the process advances to step S108.

In step S108, the TCU 551 determines whether or not a gearshift shock is serious more than a predetermined level when the clutch 51 is switched from the clutch-disconnected state to the clutch-connected state. The TCU 551 determines whether or not the gearshift shock is serious more than a predetermined level on the basis of a gearshift shock map obtained from the data such as the gearshift position, the engine rotation number, or the vehicle speed. If it is determined that the gearshift shock is serious more than the predetermined level, the process advances to step S109. If it is determined that the gearshift shock is less serious than the predetermined level, the process advances to step S110. Note that the predetermined level is appropriately set without a particular limitation.

In step S109, the TCU 551 reduces the gearshift shock by slowly switching the clutch 51 from the clutch-disconnected state to the clutch-connected state. Meanwhile, in step S110, the TCU 551 rapidly switches the clutch 51 from the clutch-disconnected state to the clutch-connected state without using the half-clutch state. Through this process, the change of the gearshift position is completed.

As described above, the TCU 551 drives the clutch actuator motor 61 and the gearshift actuator motor 71 to change the gearshift position when the selector 414 is manipulated, and any gearshift detection signal SU or SD is received. Note that the gearshift manipulation sensor 553 outputs the gearshift detection signal SU or SD to the TCU 551 nearly simultaneously when an upshift or downshift manipulation of the selector 414 starts. In addition, if the gearshift detection signal SU or SD is received, the TCU 551 drives the clutch actuator motor 61 and the gearshift actuator motor 71 to change the gearshift position. In this configuration, it is possible to shorten a time lag from the start of the upshift or downshift manipulation in the selector 414 to the start of the gearshift position change. Therefore, it is possible to obtain a sporty control feeling like a manual transmission.

A pivot detection position is set between a pivot start position and a pivot end position of the selector 414. The gearshift manipulation sensor 553 outputs the gearshift detection signal SU or SD when the selector 414 passes over the pivot detection position. The TCU 551 operates the clutch actuator motor 61 and the gearshift actuator motor 71 to finish the gearshift position change by receiving the gearshift detection signal SU or SD before the selector 414 is pivoted to the pivot end position.

In this configuration, the AMT mechanism 5 completes the gearshift position change before the selector 414 is pivoted from the pivot start position through the pivot detection position to the pivot end position. For this reason, it is possible to shorten the time elapsing from the start of manipulation of the selector 414 to the completion of the gearshift position change and obtain a gearshift response similar or superior to that of a manual transmission (MT).

Note that, although the gearshift position change operation or the clutch 51 connection/disconnection operation using the TCU 551 has been described as an example of the operation, the invention is not limited thereby.

<Gearshift Holding Mechanism>

Next, an exemplary configuration of the gearshift holding mechanism 8 will be described. FIGS. 7A to 7D schematically illustrate an exemplary configuration and operation of the gearshift holding mechanism 8 as seen in the axial line direction of the shift cam 525 (as seen on a cross section perpendicular to the rotation center line C).

As illustrated in FIGS. 7A to 7D, the gearshift holding mechanism 8 includes a shift stopper plate 81 as an example of the rotatable member, a shift stopper arm 82 as an example of the stopper member, and a biasing member 83. The shift stopper plate 81 is provided in one end of the axial line direction of the shift cam 525 (in this embodiment, the right end of the vehicle width direction) and is rotated in synchronization with the shift cam 525. The shift stopper plate 81 has an approximately circular shape concentric to the rotation center line C of the shift cam 525 as seen on the cross section perpendicular to the rotation center line C of the shift cam 525. In addition, a plurality of indented portions 812 are arranged on the outer circumferential surface of the shift stopper plate 81 along a circumferential direction (rotational direction) such that the shift stopper arm 82 is inserted (engaged) into the indented portion 812. For this reason, the unindented portions between the indented portions 812 on the outer circumferential surface of the shift stopper plate 81 are curved in a circular arc shape concentric to the rotation center line C of the shift cam 525. For the purpose of simplicity, the circular arc surface concentric to the rotation center line C of the shift cam 525 between the indented portions 812 on the outer circumferential surface will be referred to as a "concentric arc curve portion."

Note that the number of indented portions 812 is not particularly limited, but may be appropriately set depending on the number of gearshift positions of the AMT mechanism 5. In addition, the shapes and dimensions of the indented portions 812 are not particularly limited, and may be set to allow insertion or removal of the roller 822 of the shift stopper arm 82 as described below. For example, the indented portions 812 may have a circular arc shape having nearly the same radius of curvature as that of the outer diameter of the roller 822 of the shift stopper arm. 82 described below as seen on the cross section perpendicular to the rotation center line C of the shift cam 525.

The shift stopper arm 82 holds rotational positions of the shift cam 525 and the shift stopper plate 81 as the shift stopper arm 82 is selectively inserted (engaged) to any one of the plurality of indented portions 812 on the outer circumferential surface of the shift stopper plate 81. The shift stopper arm 82 is provided, for example, in the casing body 410 of the crankcase 41 using a bracket or the like rotatably (swingably) with respect to a rotational axis 821. In addition, the shift stopper arm 82 is reciprocatable (swingable) such that its tip can come into contact with the outer circumferential surface of the shift stopper plate 81 or be separated therefrom. The tip of the shift stopper arm 82 is provided with a roller 822. The roller 822 has, for example, a rotatable disk or circular columnar shape, in addition, the roller 822 is insertable to or removable from the indented portion 812 provided on the outer circumferential surface of the shift stopper plate 81. Note that the rotation center line of the roller 822 is in parallel with the rotation center lines C of the shift cam 525 and the shift stopper plate 81. In addition, as the shift stopper arm 82 swings, the roller 822 is inserted to or removed from the indented portion 812 provided on the outer circumferential surface of the shift stopper plate 81.

The biasing member 83 forces the tip of the shift stopper arm 82 to press on the outer circumferential surface of the shift stopper plate 81. A coil spring or the like may be employed as the biasing member 83. However, any configuration may be employed in the biasing member 83 without a specific limitation as long as the tip of the shift stopper arm 82 can be biased onto the outer circumferential surface of the shift stopper plate 81.

The roller 822 provided in the tip of the shift stopper arm 82 comes into contact with the outer circumferential surface of the shift stopper plate 81 and is held in this state by virtue of the biasing force of the biasing member 83. For this reason, as the shift stopper plate 81 is rotated in synchronization with the shift cam 525, the roller 822 rolls while it comes in contact with the outer circumferential surface of the shift stopper plate 81. When the rotational position of the indented portion 812 provided on the outer circumferential surface of the shift stopper plate 81 matches the position of the roller 822 provided in the tip of the shift stopper arm 82, the roller 822 is inserted into the indented portion 812 by virtue of the biasing force of the biasing member 83.

According to this embodiment, since the roller 822 of the shift stopper arm 82 is inserted into the indented portion 812 provided on the outer circumferential surface of the shift stopper plate 81, the rotational position of the shift cam 525 is held. As a result, the gearshift position of the AMT mechanism 5 is held. Specifically, a plurality of indented portions 812 provided on the outer circumferential surface of the shift stopper plate 81 correspond to a plurality of gearshift positions, respectively (for example, L-position (first speed), N-position (neutral), second speed position, third speed position, fourth speed position, fifth speed position, and sixth speed position).

If the rotational position of the roller 822 matches any one of the indented portions 812 of the shift stopper plate 81, the roller 822 is inserted into the indented portion 812 by virtue of the biasing force of the biasing member 83. As a result, the AMT mechanism 5 is set to a gearshift position corresponding to the indented portion 812 into which the roller 822 is inserted. In this case, the roller 822 of the shift stopper arm 82 is inserted into the indented portion 812 while it is biased by the biasing member 83. Therefore, the rotation is restricted in the shift cam 525 and the shift stopper plate 81 so that the gearshift position is held.

In order to change the gearshift position from one to another, the shift cam 525 and the shift stopper plate 81 are rotated using the driving force of the gearshift actuator motor 71. Then, the roller 822 is extruded from the indented portion 812 by virtue of the rotation of the shift stopper plate 81 and is inserted into another indented portion 812 corresponding to another gearshift position to be changed. In other words, by rotating the shift cam 525 and the shift stopper plate 81, the rotational position of the indented portion 812 corresponding to the gearshift position to be changed matches the position of the roller 822 of the shift stopper arm 82.

Figure 7A:
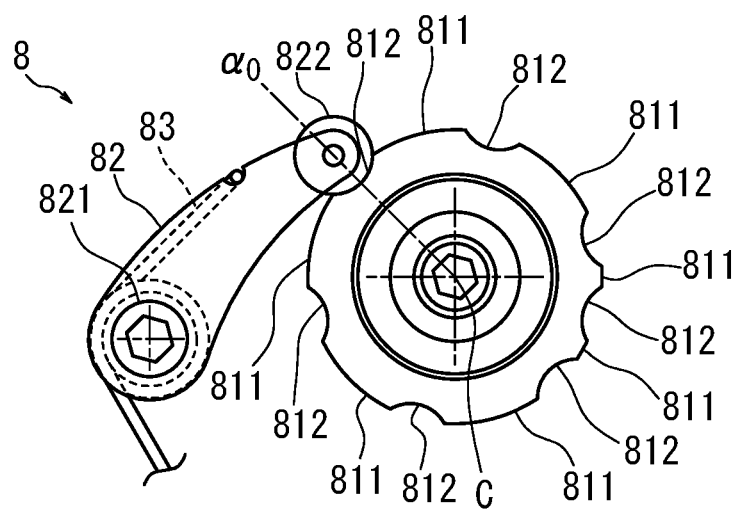
FIG. 7A is a schematic diagram illustrating an exemplary configuration and operation of a gearshift holding mechanism.
Figure 7B:
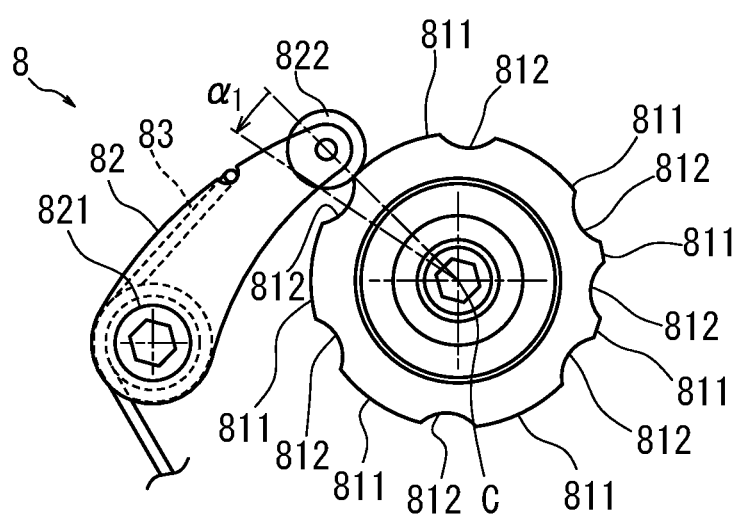
FIG. 7B is a schematic diagram illustrating an exemplary configuration and operation of the gearshift holding mechanism.

FIG. 7A illustrates a state in which the roller 822 of the shift stopper arm 82 is inserted into any one of the indented portions 812 of the shift stopper plate 81. FIG. 7B illustrates a state in which the shift stopper plate 81 is rotated from the state of FIG. 7A so that the roller 822 of the shift stopper arm 82 is extruded from the indented portion 812. In the state of FIG. 7A, the roller 822 of the shift stopper arm 82 is continuously inserted into the indented portion 812 by virtue of the biasing force of the biasing member 83. For this reason, until the state is changed from the state of FIG. 7A to the state of FIG. 7B, it is necessary to extrude the roller 822 from the indented portion 812 resisting to the biasing force of the biasing member 83 in order to rotate the shift cam 525 and the shift stopper plate 81.

Figure 7C:
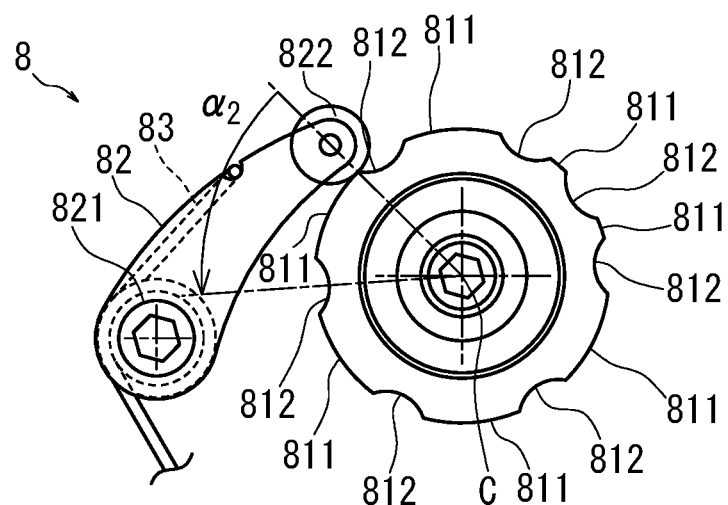
FIG. 7C is a schematic diagram illustrating an exemplary configuration and operation of the gearshift holding mechanism.
Figure 7D:
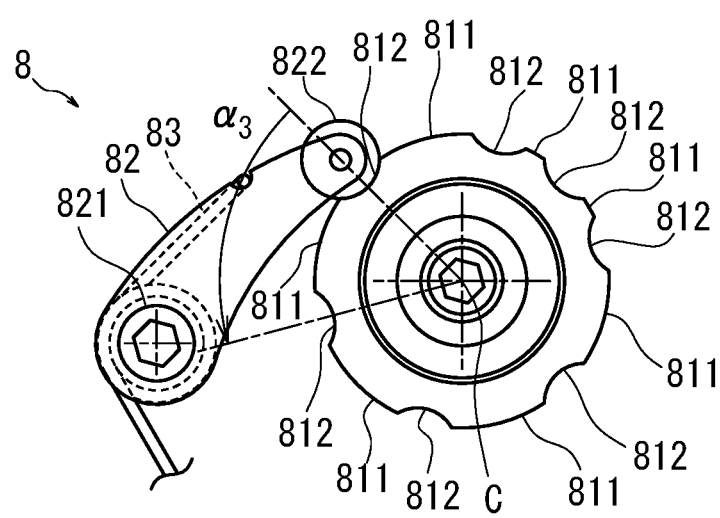
FIG. 7D is a schematic diagram illustrating an exemplary configuration and operation of the gearshift holding mechanism.

FIG. 7C illustrates a state in which the shift stopper plate 81 is further rotated from the state of FIG. 7B and starts to be inserted into another indented portion 812. FIG. 7D illustrates a state in which the shift stopper arm 82 is inserted into another indented portion 812. The concentric arc curve portion 811 between the indented portions 812 is a circular arc curved surface concentric on the rotation center line C of the shift cam 525 and the shift stopper plate 81. For this reason, when the roller 822 abuts on the concentric arc curved portion 811, the shift stopper arm 82 is not displaced even by rotating the shift stopper plate 81. In addition, since the roller 822 is biased toward the indented portion 812, it is not necessary to displace the roller 822 resisting to the biasing force of the biasing member 83 in order to insert the roller 822 into the indented portion 812 from the concentric arc curved portion 811. That is, while the roller 822 abuts on the concentric arc curved portion 811, it is not necessary to displace the shift stopper arm 82 resisting to the biasing force of the biasing member 83 when the shift cam 525 and the shift stopper plate 81 are rotated.

In this configuration, a torque necessary to rotate the shift cam 525 and the shift stopper plate from the rotational position of FIG. 7A to the rotational position of FIG. 7B is higher than a torque necessary to rotate the shift cam 525 and the shift stopper plate 81 from the rotational position of FIG. 7B to the rotational position of FIG. 7D through the rotational position of FIG. 7C. In this regard, according to this embodiment, when the gearshift position is changed, an output torque of the gearshift actuator motor 71 is differently set between an interval from a rotational position in which the roller 822 is inserted into the indented portion 812 to a rotational position in which the roller 822 abuts on the concentric arc curved portion 811 and an interval from a rotational position in which the roller 822 abuts on the concentric arc curved portion 811 to a rotational position in which the roller 822 is inserted to the indented portion 812 corresponding to the gearshift position to be changed.

Figure 8:
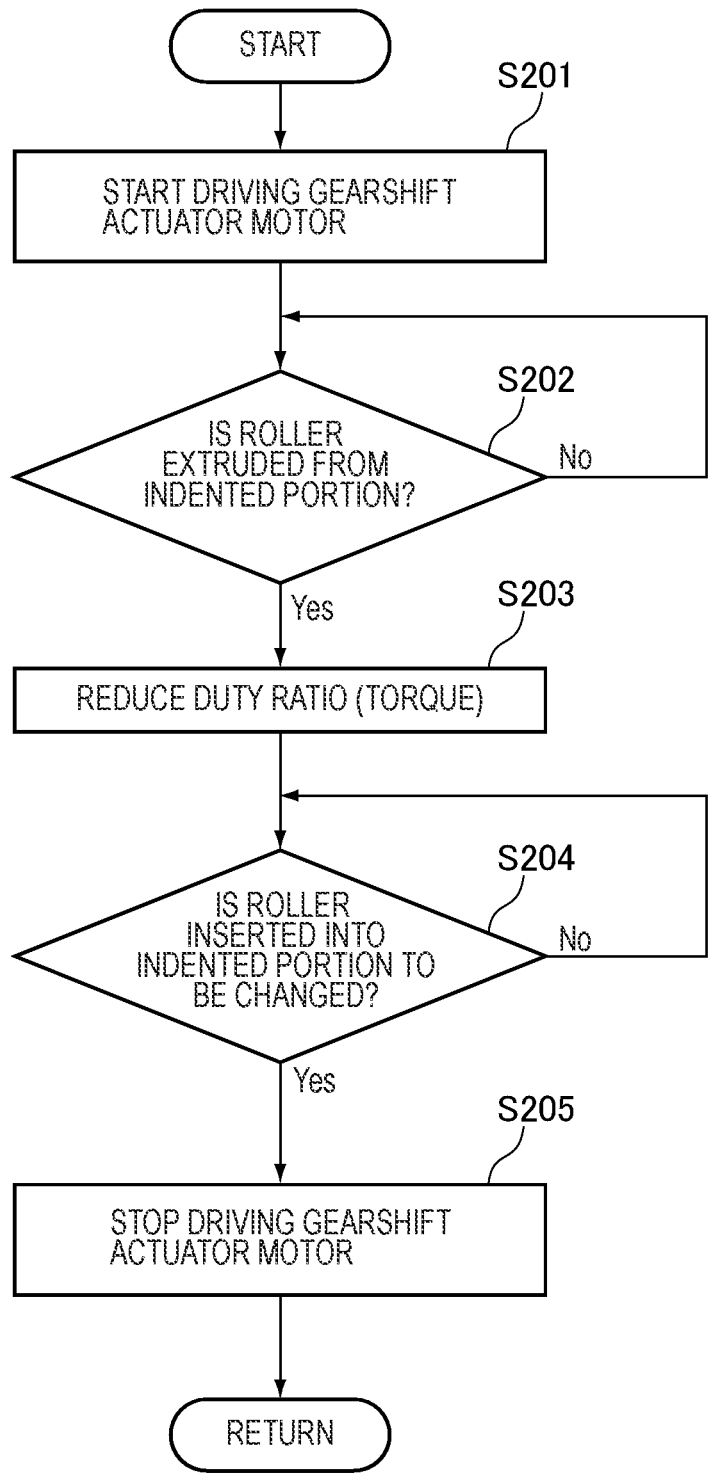
FIG. 8 is a flowchart illustrating an output torque control of a gearshift actuator motor in a gearshift position change operation.
Figure 9:
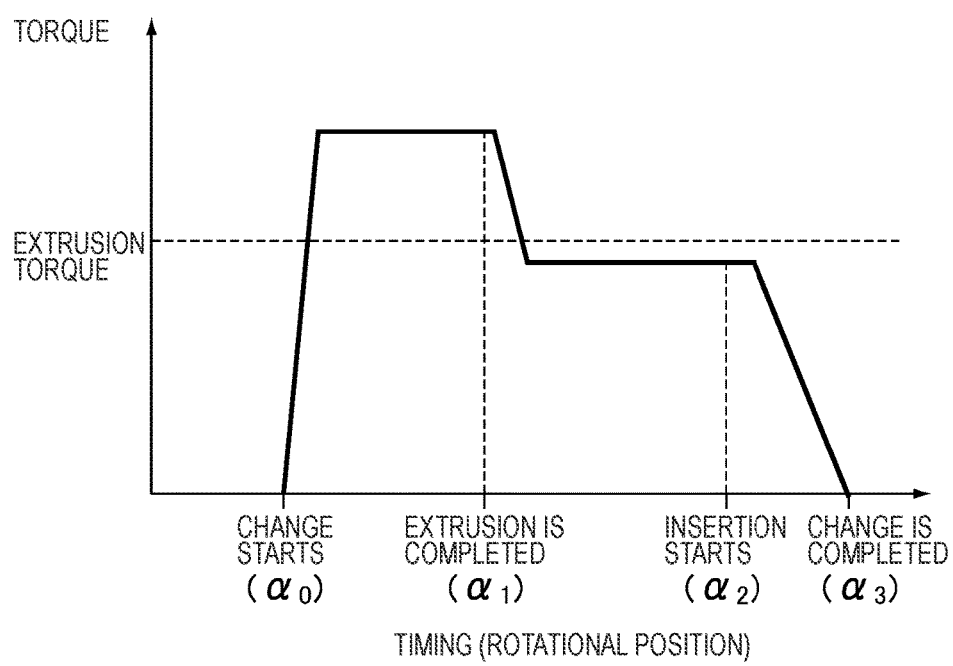
FIG. 9 is a graph illustrating an output torque transition in the gearshift actuator motor.

Here, the output torque control of the gearshift actuator motor 71 in the gearshift position change will be described with reference to FIGS. 8 and 9. FIG. 8 is a flowchart illustrating an output torque control of the gearshift actuator motor 71 in the gearshift position change performed by the TCU 551 in steps S104, S106, and S107 of FIG. 6. FIG. 9 is a diagram illustrating an output torque transition of the gearshift actuator motor 71. According to this embodiment, the TCU 551 controls the gearshift actuator motor 71 in a pulse width modulation (PWM) technique and changes the output torque by changing a duty ratio. Furthermore, it is assumed that the shift cam 525 and the shift stopper plate 81 are rotated from the rotational position of FIG. 7A to the rotational position of FIG. 7D. For the purpose of simplicity, "a minimum (threshold) value of the output torque of the gearshift actuator motor necessary to extrude the roller from the indented portion resisting to the biasing force of the biasing member when the shift cam and the shift stopper plate are rotated will be referred to as an "extrusion torque."

In step S201, as any gearshift detection signal SU or SD is received, the TCU 551 controls the gearshift actuator motor driver 557 to start driving of the gearshift actuator motor 71. In this case, as illustrated in FIG. 9, the gearshift actuator motor is driven by setting the duty ratio such that the output torque equal to or higher than the extrusion torque is generated. As a result, the shift cam 525 and the shift stopper plate 81 start rotation from the rotational position $\alpha_0$ of FIG. 7A by virtue of the driving force (rotary power) of the gearshift actuator motor 71. As the shift cam 525 and the shift stopper plate 81 are rotated, the roller 822 is extruded from the indented portion 812. If the shift cam 525 and the shift stopper plate 81 are rotated to reach the rotational position of FIG. 7B (rotated by an angle $\alpha_1$ from the initial position $\alpha_0$), the roller 822 is extruded from the indented portion 812 and comes into contact with the concentric arc curved portion 811.

Note that the duty ratio is not particularly limited. A specific duty ratio is set depending on the requirements of the gearshift actuator motor 71, a deceleration ratio of the gear train 72 of the gearshift driving mechanism 7, a biasing force of the biasing member 83 for biasing the shift stopper arm 82, a shape of the indented portion 812, and the like.

In step S202, the TCU 551 determines whether or not the shift cam 525 and the shift stopper plate 81 reach the rotational position of FIG. 7B, that is, whether or not the roller 822 is extruded from the indented portion 812 and comes into contact with the concentric arc curved portion 811. For example, the TCU 551 detects rotation angles of the shift cam 525 and the shift stopper plate 81 using the gearshift position sensor 555. In addition, the TCU 551 determines whether or not the shift cam 525 and the shift stopper plate 81 reach the rotational position of FIG. 7B on the basis of the detected rotation angle. More specifically, the TCU 551 determines that the shift cam 525 and the shift stopper plate 81 reach the rotational position of FIG. 7B when the rotation angle from the rotation start $\alpha_0$ reaches the angle $\alpha_1$ of FIG. 7B. Note that this angle $\alpha_1$ is determined on the basis of the circumferential dimension of the indented portion 812. When the shift cam 525 and the shift stopper plate 81 do not reach the rotational position of FIG. 7B, the duty ratio is maintained at a value in which the output torque equal to or higher than the extrusion torque is generated, and the gearshift actuator motor 71 is continuously driven. When the shift cam 525 and the shift stopper plate 81 reach the rotational position of FIG. 7B, the process advances to step S203.

In step S203, the TCU 551 controls the gearshift actuator motor driver 557 such that the duty ratio for driving the gearshift actuator motor 71 is reduced to a value capable of generating an output torque lower than the extrusion torque. Then, the gearshift actuator motor 71 is driven on the basis of the reduced duty ratio.

In step S204, the TCU 551 determines whether or not the rotational positions of the shift cam 525 and the shift stopper plate 81 reach the rotational position of FIG. 7D. In other words, the TCU 551 determines whether or not the roller 822 is inserted into the indented portion 812 corresponding to the gearshift position to be changed. For example, the TCU 551 detects a rotation angle of the shift cam 525 using the gearshift position sensor 555 and determines whether or not the roller 822 is inserted into the indented portion 812 corresponding to the gearshift position to be changed on the basis of the rotation angle of the shift cam 525. More specifically, the TCU 551 determines whether or not the roller 822 is inserted into the indented portion 812 corresponding to the gearshift position to be changed on the basis of whether or not the rotation angle from the start of rotation reaches an angle $\alpha_3$. The angle $\alpha_3$ is determined on the basis of the circumferential interval between the indented portions 812 (the interval in the rotational direction). If the shift cam 525 and the shift stopper plate 81 do not reach the rotational position of FIG. 7D, that is, if the roller 822 is not inserted into the indented portion 812 corresponding to the gearshift position to be changed, the TOO 551 continuously drives the gearshift actuator motor 71. In this case, the duty ratio reduced in step S203 is continuously used. When the shift cam 525 and the shift stopper plate 81 reach the rotational position of FIG. 7D, the process advances to step S205.

In step S205, the TCU 551 stops driving of the gearshift actuator motor 71 by controlling the gearshift actuator motor driver 557. Note that, when the shift cam 525 and the shift stopper plate 81 reach the rotational positions of FIGS. 7C and 7D, the output torque of the gearshift actuator motor 71 is already reduced to be lower than the extrusion torque. For this reason, if the roller 822 is inserted into the indented portion 812 corresponding to the gearshift position to be changed, the shift cam 525 and the shift stopper plate 81 stop rotation. Therefore, it is possible to prevent the shift cam 525 and the shift stopper plate 81 from being excessively rotated and reliably stop the shift cam 525 and the shift stopper plate 81 in the gearshift position to be changed.

When the shift stopper plate 81 is rotated by an angle $\alpha_2$ from the initial position $\alpha_0$ as illustrated in FIG. 7C, the roller 822 is inserted into the indented portion 812 corresponding to the gearshift position to be changed by virtue of the biasing force of the biasing member 83. For this reason, when the shift stopper plate 81 is rotated by an angle $\alpha_2$, the TCU 551 may control the gearshift actuator motor driver 557 such that the output torque of the gearshift actuator motor 71 is reduced.

Finally, through the aforementioned process, the gearshift position change operation (gearshift operation) is completed.

In this configuration, it is possible to easily control the gearshift actuator motor 71 and reduce the load of the gearshift actuator motor 71.

That is, in the prior art, the toothed portion of the shift stopper plate has an approximately triangular shape. Therefore, it is necessary to abruptly reduce the output torque of the gearshift actuator motor or set it to zero immediately after the shift stopper arm climbs over the toothed portion. In contrast, according to this embodiment, the concentric arc curved portion 811 having a circular arc curved shape concentric on the rotation center line C of the shift cam 525 and the shift stopper plate 81 is provided between the indented portions 812. In this configuration, after the roller 822 is extruded from the indented portion 812, and the shift cam 525 and the shift stopper plate 81 are rotated by some distance, the roller 822 is inserted into the indented portion 812 corresponding to the gearshift position to be changed. Note that this "some distance" corresponds to a circumferential dimension of the concentric arc curved portion 811. For this reason, the output torque of the gearshift actuator motor 71 may be reduced while the roller 822 is extruded from the indented portion 812 and then comes in contact with the concentric arc curved portion 811. In this manner, it is possible to provide extra time for controlling the output torque. Therefore, it is possible to easily control the gearshift actuator motor 71. More specifically, it is possible to remove necessity of relatively strictly setting the output torque change timing of the gearshift actuator motor 71 compared to the configuration of the prior art.

In the configuration of the prior art, in the event of the gearshift position change, a strong torque is necessary to allow the shift stopper arm to climb over the toothed portion during the first half of rotation of the shift cam and the shift stopper plate. In contrast, according to this embodiment, the output torque of the gearshift actuator motor 71 increases only in the initial stage of the rotation of the shift cam 525 and the shift stopper plate 81, and the output torque may be reduced thereafter. For this reason, according to this embodiment, compared to the configuration of the prior art, it is possible to reduce the load of the gearshift actuator motor 71. Furthermore, compared to the configuration of the prior art, it is possible to reduce a displacement of the shift stopper arm 82 (the displacement resisting to the biasing force of the biasing member 83). For this reason, a torque necessary to extrude the roller 822 of the shift stopper arm 82 from the indented portion 812 can be reduced, compared to the torque necessary to allow the roller 822 to climb over the toothed portion in the configuration of the prior art. Therefore, it is possible to reduce the load of the gearshift actuator motor 71.

While preferred embodiments of the invention have been described and illustrated hereinbefore, it should be understood that they are only for exemplary purposes and are not to be construed as limitations. Any addition, omission, substitution, or modification may be possible without departing from the spirit or scope of the present invention.

For example, any configuration known in the art may be employed as a mechanical configuration of the AMT mechanism except for the configuration of the gearshift holding mechanism. Shortly to say, the present invention may be employed in any configuration as long as the gearshift position is determined on the basis of the rotational position of the shift cam, and the gearshift position is changed (gearshift operation is performed) by rotating the shift cam.

Although the engine unit is an in-line four-cylinder engine in the embodiments described above, the number or arrangement of cylinders provided in the engine unit are not particularly limited. The present invention may be applied to any engine unit as long as the engine unit has an AMT mechanism capable of changing the gearshift position by rotating the shift cam. Although the vehicle according to the present invention is a saddle type on-road motorcycle in the aforementioned embodiment, a vehicle applicable to the present invention is not limited to the on-road motorcycle. The present invention may also be applied to an off-road motorcycle as long as the engine unit having the aforementioned AMT mechanism is mounted. A vehicle according to the present invention is not limited to a motorcycle. For example, the present invention may also be applied to other types of vehicles such as a four-wheel buggy car.

The present invention relates to a technology suitable for a vehicle transmission system capable of changing a gearshift position using an actuator. According to the present invention, it is possible to easily control the actuator and reduce a load of the actuator.

According to the present invention, a torque of the gearshift actuator motor may increase until the shift stopper arm is extruded from the indented portion, and may decrease thereafter. In addition, since a circular arc curved surface concentric on the rotation center line is provided in the unindented portion between the indented portions, the output torque of the gearshift actuator motor may decrease while the shift stopper arm comes in contact with the curved surface. Therefore, it is possible to easily control the actuator. Furthermore, after the shift stopper arm is extruded from the indented portion, a torque necessary to rotate the shift stopper plate is reduced. For this reason, it is possible to reduce a load of the shift actuator.

What is claimed is:

1. A vehicle transmission system comprising:
   an input shaft configured to receive transmitted rotary power;

an output shaft configured to output the rotary power;
a plurality of driving gears that are provided in the input shaft and include a slide gear reciprocatable in an axial line direction of the input shaft;
a plurality of driven gears that are provided in the output shaft, include a slide gear reciprocatable in an axial line direction of the output shaft, and mesh with the plurality of driving gears;
a plurality of shift forks configured to move each of the slide gear of the plurality of driving gears and the slide gear of the plurality of driven gears;
a rotatable shift cam configured to rotate to move the plurality of shift forks;
an actuator configured to rotate the shift cam; and
a holding mechanism configured to hold a rotational position of the shift cam,
wherein the holding mechanism has
  a rotatable member configured to rotate in synchronization with the shift cam and provided with a plurality of indented portions arranged in a rotational direction and
  a stopper member insertable to or removable from the indented portion of the rotatable member and biased toward the indented portion so that a rotational position of the rotatable member is held as the stopper member is inserted into the indented portion of the rotatable member, and
an unindented portion between the plurality of indented portions on an outer circumferential surface of the rotatable member is a circular arc curved surface concentric on the rotation center line as seen on a cross section perpendicular to the rotation center line of the shift cam, wherein
the circular arc curved surface is formed so that a rotation angle of a shift stopper plate from a state in which the stopper member is extruded from the indented portion and comes in contact with the curved surface until the stopper member is biased to be inserted into the indented portion corresponding to a gearshift position to be changed is larger than a rotation angle of the shift stopper plate from an initial position before a transmission operation to a state in which the stopper member is extruded from the indented portion and comes in contact with the curved surface.

2. The vehicle transmission system according to claim 1, further comprising a control unit configured to control the actuator,
wherein, when the shift cam is rotated by driving the actuator, the control unit performs control such that the actuator generates a torque necessary to allow the stopper member to get out of the indented portion or higher until the stopper member is extruded from the indented portion and comes in contact with the circular arc curved surface, and
after the stopper member comes in contact with the circular arc curved surface, the actuator generates a constant torque lower than that necessary to allow the stopper member to get out of the indented portion, and
when the stopper member is inserted into the indented portion corresponding to the shift position to be changed, an output torque of the actuator is reduced.

3. A vehicle transmission system comprising:
an input shaft configured to receive transmitted rotary power;
an output shaft configured to output the rotary power;
a plurality of driving gears that are provided in the input shaft and include a slide gear reciprocatable in an axial line direction of the input shaft;
a plurality of driven gears that are provided in the output shaft, include a slide gear reciprocatable in an axial line direction of the output shaft, and mesh with the plurality of driving gears;
a plurality of shift forks configured to move each of the slide gear of the plurality of driving gears and the slide gear of the plurality of driven gears;
a rotatable shift cam configured to rotate to move the plurality of shift forks;
an actuator configured to rotate the shift cam; and
a holding mechanism configured to hold a rotational position of the shift cam,
wherein the holding mechanism has
  a rotatable member configured to rotate in synchronization with the shift cam and provided with a plurality of indented portions arranged in a rotational direction and
  a stopper member insertable to or removable from the indented portion of the rotatable member and biased toward the indented portion so that a rotational position of the rotatable member is held as the stopper member is inserted into the indented portion of the rotatable member, and
an unindented portion between the plurality of indented portions on an outer circumferential surface of the rotatable member is a circular arc curved surface concentric on the rotation center line as seen on a cross section perpendicular to the rotation center line of the shift cam, wherein
the indented portion and the circular arc curved surface have respective tips which match each other to form a sharp corner.

4. A vehicle transmission system comprising:
an input shaft configured to receive transmitted rotary power;
an output shaft configured to output the rotary power;
a plurality of driving gears that are provided in the input shaft and include a slide gear reciprocatable in an axial line direction of the input shaft;
a plurality of driven gears that are provided in the output shaft, include a slide gear reciprocatable in an axial line direction of the output shaft, and mesh with the plurality of driving gears;
a plurality of shift forks configured to move each of the slide gear of the plurality of driving gears and the slide gear of the plurality of driven gears;
a rotatable shift cam configured to rotate to move the plurality of shift forks;
an actuator configured to rotate the shift cam; and
a holding mechanism configured to hold a rotational position of the shift cam,
wherein the holding mechanism has
  a rotatable member configured to rotate in synchronization with the shift cam and provided with a plurality of indented portions arranged in a rotational direction and
  a stopper member insertable to or removable from the indented portion of the rotatable member and biased toward the indented portion so that a rotational position of the rotatable member is held as the stopper member is inserted into the indented portion of the rotatable member, and
an unindented portion between the plurality of indented portions on an outer circumferential surface of the rotatable member is formed only from a circular arc curved surface concentric on the rotation center line as seen on a cross section perpendicular to the rotation center line of the shift cam.

* * * * *